US008902301B2

(12) United States Patent  
Izawa

(10) Patent No.: US 8,902,301 B2
(45) Date of Patent: Dec. 2, 2014

(54) ORGANIC ELECTROLUMINESCENCE DISPLAY DEVICE, VIDEO DISPLAY SYSTEM, AND VIDEO DISPLAY METHOD

(75) Inventor: Yosuke Izawa, Osaka (JP)

(73) Assignee: Panasonic Corporation, Osaka (JP)

( * ) Notice: Subject to any disclaimer, the term of this patent is extended or adjusted under 35 U.S.C. 154(b) by 616 days.

(21) Appl. No.: 13/292,595

(22) Filed: Nov. 9, 2011

(65) Prior Publication Data

US 2012/0113237 A1   May 10, 2012

Related U.S. Application Data

(63) Continuation of application No. PCT/JP2010/002132, filed on Mar. 25, 2010.

(51) Int. Cl.
*H04N 13/04* (2006.01)
*G09G 3/00* (2006.01)
*G09G 3/32* (2006.01)

(52) U.S. Cl.
CPC .......... *G09G 3/3233* (2013.01); *G09G 2310/08* (2013.01); *G09G 3/003* (2013.01); *H04N 13/0438* (2013.01)
USPC .......................................................... 348/55

(58) Field of Classification Search
CPC .......... H04N 13/0429; H04N 13/0431; H04N 13/0434; H04N 13/0436; H04N 13/0438
USPC ...................................... 348/55, 56, E13.026
See application file for complete search history.

(56) References Cited

U.S. PATENT DOCUMENTS

| 7,720,308 | B2 | 5/2010 | Kitaura et al. |
| 8,674,902 | B2 | 3/2014 | Park et al. |
| 2006/0126919 | A1 | 6/2006 | Kitaura et al. |
| 2007/0046776 | A1* | 3/2007 | Yamaguchi et al. ............ 348/53 |

(Continued)

FOREIGN PATENT DOCUMENTS

| CN | 1925626 | 3/2007 |
| CN | 101547371 | 9/2009 |

(Continued)

OTHER PUBLICATIONS

Written Opinion of international searching authority for corresponding international application PCT/JP2010/002132 (Dated Jun. 22, 2010).*

(Continued)

*Primary Examiner* — Mehrdad Dastouri
*Assistant Examiner* — Mohammed Rahaman
(74) *Attorney, Agent, or Firm* — Greenblum & Bernstein, P.L.C.

(57) ABSTRACT

An organic electroluminescence display includes pixels in a matrix that each emits visible light. A data line driver supplies a video signal to each pixel. The video signal includes first and second frames corresponding to first-eye and second-eye image information. A scanning line driver distributes a scanning signal to each pixel for controlling a supply of the video signal. The display includes an emitter in an arrangement position of the pixels in the matrix. The emitter emits infrared light in a same direction as the visible light. The scanning line driver supplies a control signal to the emitter that indicates a switching timing between the first frame and the second frame, and causes the emitter to emit the infrared light based on the control signal for reception by eye glasses for controlling opening and closing of electronic shutters.

21 Claims, 11 Drawing Sheets

(56) References Cited

U.S. PATENT DOCUMENTS

| | | | |
|---|---|---|---|
| 2009/0160826 A1* | 6/2009 | Miller et al. | 345/204 |
| 2009/0237327 A1 | 9/2009 | Park et al. | |
| 2010/0033461 A1* | 2/2010 | Hasegawa et al. | 345/211 |
| 2010/0066820 A1* | 3/2010 | Park et al. | 348/53 |
| 2014/0139653 A1 | 5/2014 | Park et al. | |

FOREIGN PATENT DOCUMENTS

| | | |
|---|---|---|
| JP | 2000-004453 | 1/2000 |
| JP | 2001-245324 | 9/2001 |
| JP | 2004-165708 | 6/2004 |
| JP | 2006-186768 | 7/2006 |
| JP | 2009-302770 | 12/2009 |
| JP | 2010-039398 | 2/2010 |

OTHER PUBLICATIONS

International Search Report in PCT/JP2010/002132, dated Jun. 22, 2010.

Office Action from the Patent Office of the People's Republic of China in Chinese Patent Application No. 201080002215.7, dated Jul. 17, 2014, together with a partial English language translation.

* cited by examiner

FIG. 1
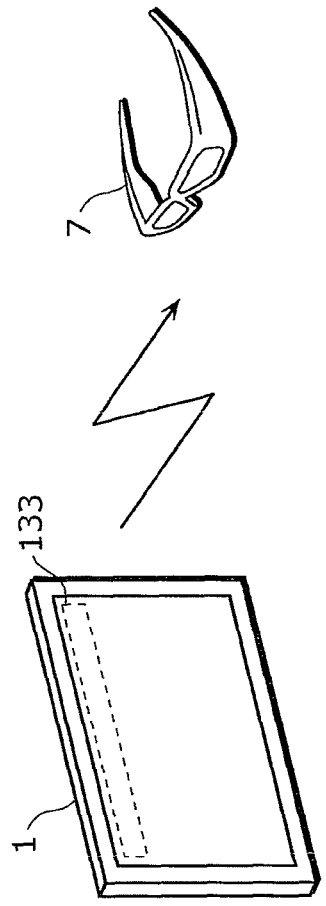
(A)
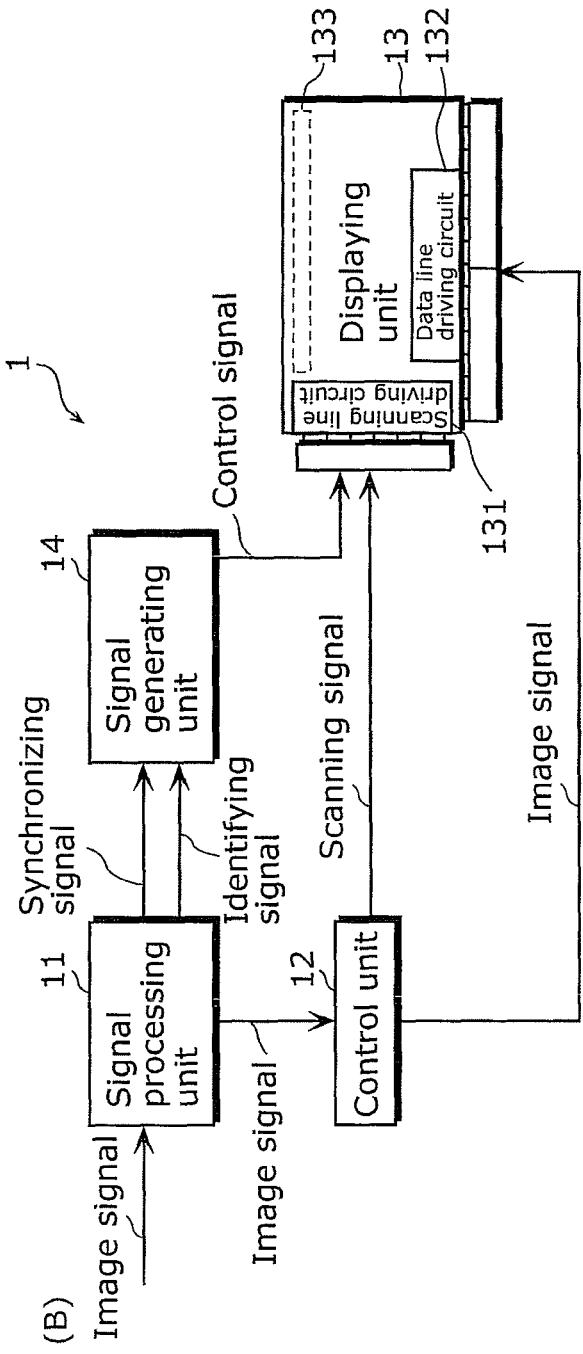
(B)

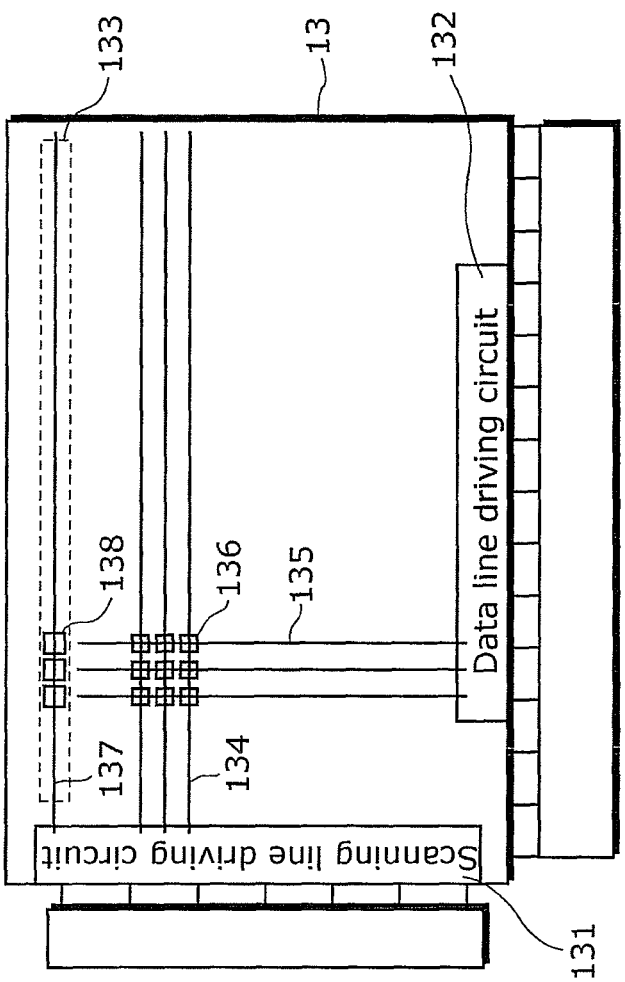
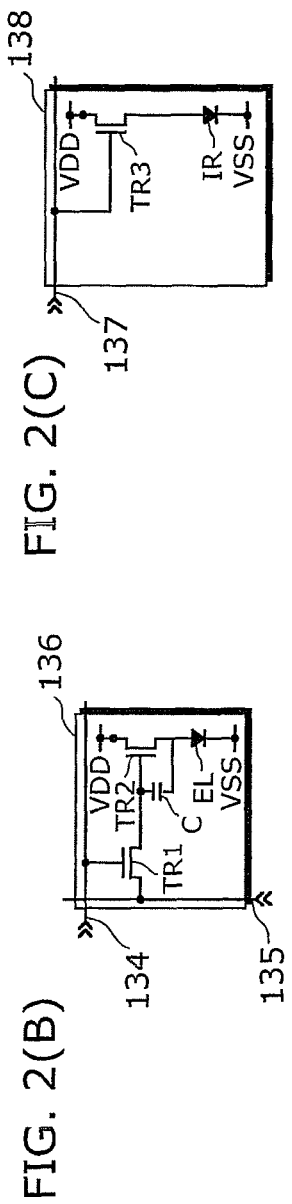
FIG. 2(A)
FIG. 2(B)
FIG. 2(C)

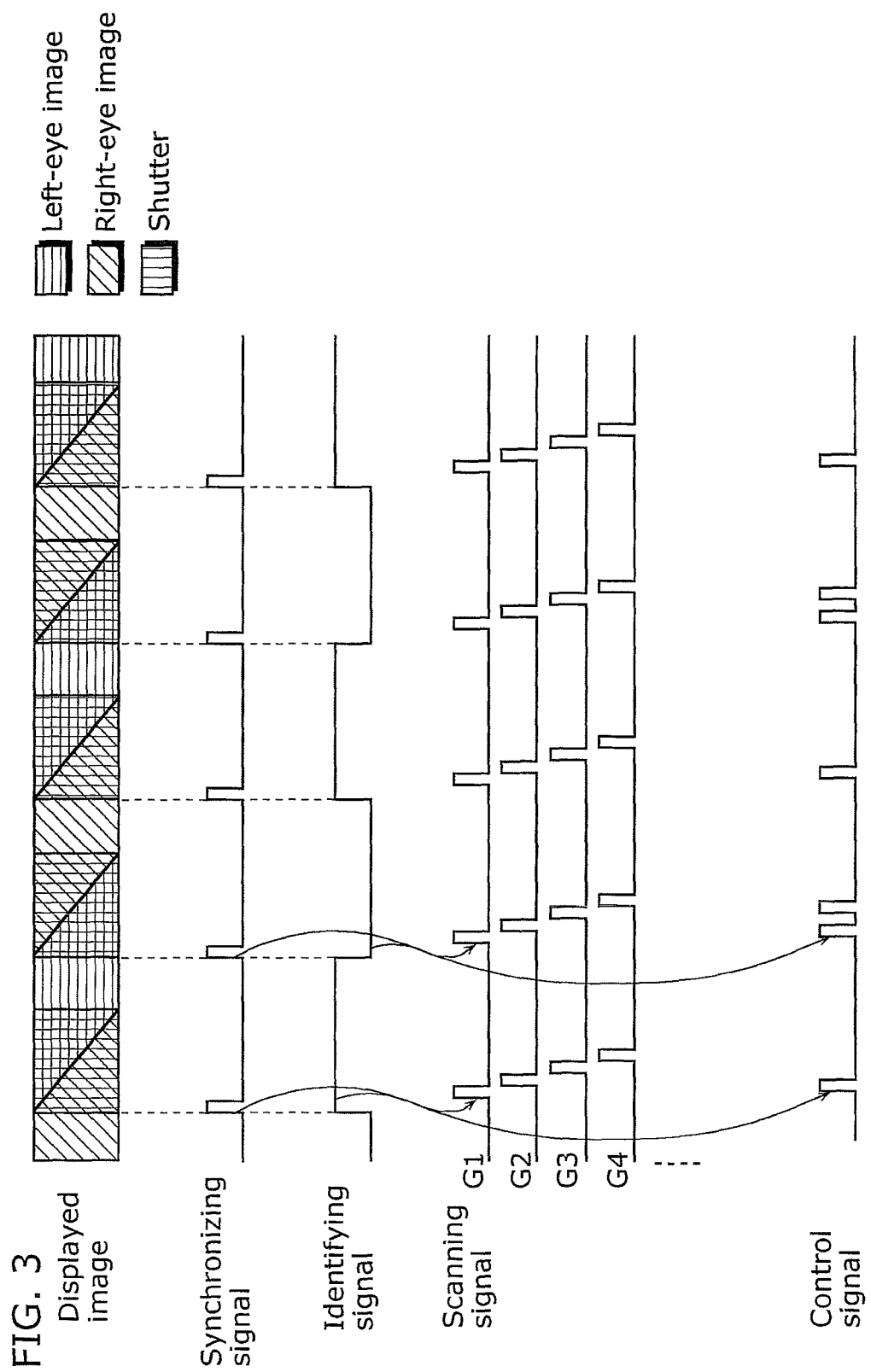

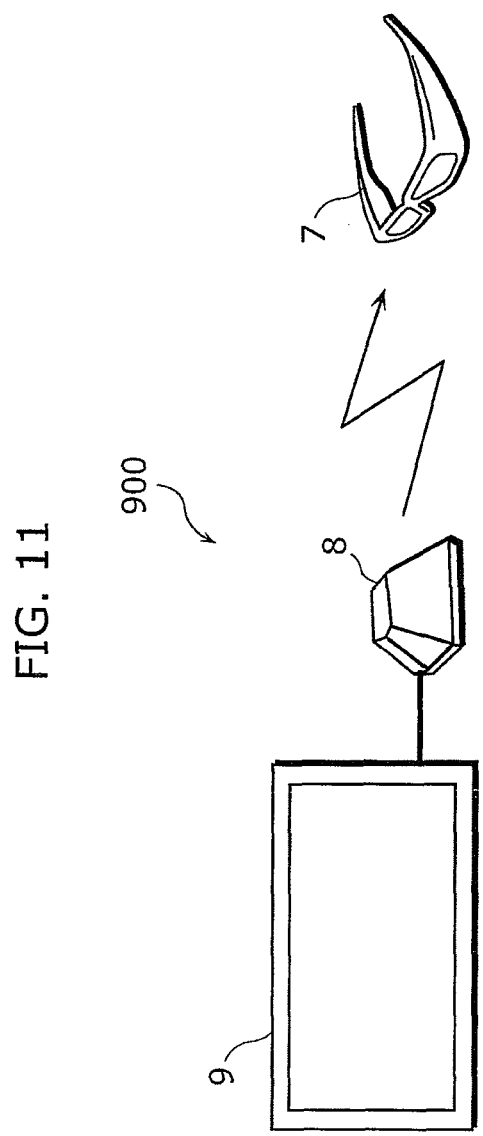

ORGANIC ELECTROLUMINESCENCE DISPLAY DEVICE, VIDEO DISPLAY SYSTEM, AND VIDEO DISPLAY METHOD

CROSS REFERENCE TO RELATED APPLICATION

This is a continuation application of PCT Application No. PCT/JP10/002,132 filed on Mar. 25, 2010, designating the United States of America, the disclosure of which, including the specification, drawings and claims, is incorporated herein by reference in its entirety.

BACKGROUND OF THE INVENTION

1. Field of the Invention

The present invention relates to organic electroluminescence (EL) display devices, video display systems, and video display methods and, more particularly, an organic electroluminescence displaying device, a video display system, and a video display method which are suitable for use in displaying three-dimensional video.

2. Description of the Related Art

In order for a user to receive three-dimensional video, one of exemplified and typical techniques constructs three-dimensional video by switching between (i) image information for one eye and (ii) image information for the other eye, both of the image information which correspond to parallax used for watching the three-dimensional video.

This technique involves separating the video signal into (i) a first frame in which the image information for the one eye is set and (ii) a second frame in which the image information for the other eye is set. The user recognizes three-dimensional video via electronic eye glasses whose left and right shutters open and close, synchronizing with the first frame and the second frame, respectively. For example, in the first frame, the user recognizes the right-eye image information when the left-eye shutter closes. In the second frame, the user recognizes the left-eye image information when the right-eye shutter closes.

Here, in order to establish a wireless connection between a display device and the electronic eye glasses, an emitter is required. The emitter transmits a signal synchronizing switching timing between the first frame and the second frame.

FIG. 11 is a perspective view exemplifying an appearance of a conventional video display system 900 typically used for receiving three-dimensional video. The video display system 900 includes a display device 9, an emitter 8, and eye glasses with electronic shutters (hereinafter referred to as electronic eye glasses) 7.

The display device 9 sequentially displays the first frame and the second frame respectively corresponding to a right-eye image and a left-eye image of three-dimensional video. The emitter 8 transmits to the electronic eye glasses 7 a control signal indicating switching timing between the first frame and the second frame. In response to the reception of a control signal from the emitter 8, the electronic eye glasses 7 controls opening and closing of the shutters corresponding to the first frame and the second frame.

For example, three-dimensional video display device disclosed in Patent Reference 1 (Japanese Unexamined Patent Application Publication No. 2009-302770) is equipped with an external emitter, similar to the one shown in the typical example illustrated in FIG. 11. In order for the user to receive the three-dimensional video, the external emitter needs to be installed such that the emitter is connected to the display device, and the control signal transmitted from the emitter properly arrives at the electronic eye glasses.

In view of reducing such a trouble for the user, some known techniques introduce an emitter built in a TV, and use an infrared signal transmitted from the built-in emitter so as to control opening and closing of the shutters of the electronic eye glasses (See Patent Reference 2: Japanese Unexamined Patent Application Publication No. 2000-4453 and Patent Reference 3: Japanese Unexamined Patent Application Publication No. 2001-245324, for example).

The built-in emitter frees the user from the trouble in installing the emitter out of the TV; however, the emitter and a driver thereof should be installed in the TV. This is a problem in simplifying the TV structure. In addition, the built-in emitter is required to be correctly set up in the TV toward the user. This is another problem in simplifying a manufacturing process of the TV.

The present invention is conceived in view of the above problems and has as an object to provide organic EL display devices which transmit a control signal used for displaying three-dimensional video on user-wearable electronic eye glasses and, more particularly, an organic EL display device, a video display system, and a video display method which are beneficial to simplification of the device's circuit structure and manufacturing process.

SUMMARY OF THE INVENTION

In order to solve the above problems, an organic EL display device according to an aspect of the present invention emits infrared light to be received by eye glasses equipped with electronic shutters for right and left eyes. The organic EL display device comprising: pixel units each of which includes a luminescent element which emits visible light and a driving element which drives the luminescent element; a displaying unit which has the pixel units arranged in an N×M matrix; a data line driving circuit which supplies a video signal to each of the pixel units arranged in the displaying unit, the video signal constructing three-dimensional video out of a first frame and a second frame respectively corresponding to right-eye image information and to left-eye image information of the three-dimensional video; and a scanning line driving circuit which distributes a scanning signal to each of the pixel units so as to control the supply of the video signal to each of the pixel units, wherein the displaying unit includes one or more emitting units (i) placed in at least one of arrangement positions of the pixel units arranged in the N×M matrix, and (ii) including a predetermined element of which infrared light travels in a same direction as the visible light of the luminescent element, and a driving element which drives the predetermined element, and the scanning line driving circuit (i) supplies to the emitting unit a control signal indicating switching timing between the first frame and the second frame, and (ii) causes the predetermined element to emit the infrared light based on the control signal so that the eye glasses equipped with electronic shutters receive the infrared light so as to control opening and closing of the electronic shutters for the right and left eyes.

The above aspect makes possible opening and closing control of the shutters of the electronic eye glasses via infrared communication between the emitting unit included in the display device and the electronic eye glasses. Thanks to the above structure, an emitter, which is used to be an external unit, can be included in the display device.

In addition, the structure makes possible sharing the lines, which are provided to each pixel unit and the scanning line driving circuit used for controlling the supply of the video signal to each pixel unit, between the pixel units and the emitting units. Thus, there is no need for an extra driver for driving the emitter units, which contributes to a more simple circuit structure of the organic EL display device.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 (A) is a perspective view exemplifying an appearance of a video display system according to Embodiment 1 in the present invention;

FIG. 1 (B) is a functional block diagram exemplifying a functional structure of the organic EL display device according to Embodiment 1 in the present invention;

FIG. 2 (A) is a functional block diagram exemplifying a functional structure of a displaying unit according to Embodiment 1 in the present invention;

FIG. 2 (B) is a circuit diagram exemplifying a functional structure of a pixel unit;

FIG. 2 (C) is a circuit diagram exemplifying a functional structure of an emitting unit;

FIG. 3 is a timing diagram exemplifying an operation of the organic EL display device according to Embodiment 1 in the present invention;

FIG. 7 (B) is a circuit diagram showing a signal generating unit according to the specific example;

FIG. 11 is a perspective view exemplifying an appearance of a conventional video display system.

DESCRIPTION OF THE PREFERRED EMBODIMENTS

Figure 4:
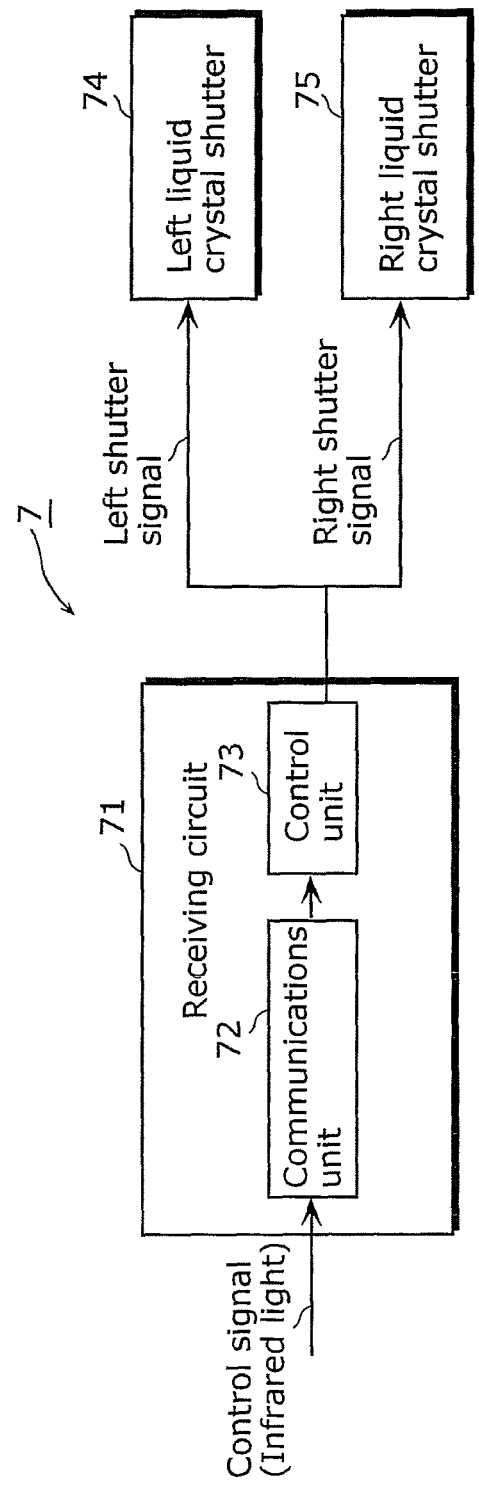
FIG. 4 is a functional block diagram exemplifying a functional structure of electronic eye glasses according to Embodiment 1 in the present invention.

An organic EL display device according to an implementation of the present invention emits infrared light to be received by eye glasses equipped with electronic shutters for right and left eyes. The organic EL display device comprising: pixel units each of which includes a luminescent element which emits visible light and a driving element which drives the luminescent element; a displaying unit which has the pixel units arranged in an N×M matrix; a data line driving circuit which supplies a video signal to each of the pixel units arranged in the displaying unit, the video signal constructing three-dimensional video out of a first frame and a second frame respectively corresponding to right-eye image information and to left-eye image information of the three-dimensional video; and a scanning line driving circuit which distributes a scanning signal to each of the pixel units so as to control the supply of the video signal to each of the pixel units, wherein the displaying unit includes one or more emitting units (i) placed in at least one of arrangement positions of the pixel units arranged in the N×M matrix, and (ii) including a predetermined element of which infrared light travels in a same direction as the visible light of the luminescent element, and a driving element which drives the predetermined element, and the scanning line driving circuit (i) supplies to the emitting unit a control signal indicating switching timing between the first frame and the second frame, and (ii) causes the predetermined element to emit the infrared light based on the control signal so that the eye glasses equipped with electronic shutters receive the infrared light so as to control opening and closing of the electronic shutters for the right and left eyes.

According to the implementation of the present invention, the emitter units are placed in some of providing positions of the pixel units arranged in the matrix within the displaying unit. Here, each emitter unit has a predetermined element, instead of the pixel unit, emitting infrared light, and a driving element driving the predetermined element. Then, the scanning line driving circuit supplies to the emitting unit the control signal indicating the switching timing between the first frame and the second frame which display the three-dimensional video. The scanning line driving circuit causes the predetermined element to emit the infrared light based on the control signal. In other words, the emitter unit provides the control signal as infrared light to be emitted from the predetermined element.

The above implementation makes possible opening and closing control of the shutters of the electronic eye glasses via infrared communication between the emitting unit included in the display device and the electronic eye glasses. Accordingly, an emitter, which is used to be an external unit, can be built in the display device. This eliminates the trouble of setting up and connecting the emitter to the display device.

In the implementation, moreover, the emitting units, instead of the pixel units, are placed in some of arrangement positions of the pixel units arranged in the matrix. Thus lines, which are provided to the scanning line driving circuit and each of the pixel units 136, can be shared with the pixel units and the emitting units. Here, the scanning line driving circuit controls the supply of the video signal to each pixel unit. Thus there is no need for an extra driver for driving the emitter units, which contributes to a more simple circuit structure of the organic EL display device. As a result, the manufacturing cost of the organic EL display device can be reduced.

Furthermore, the emitting unit emits the infrared light in the same direction as the luminescent element emits light. Therefore, the emitting direction of the light from the luminescent element is the same as that of the infrared light from the predetermined element. As a result, the infrared light emitted from the emitting unit travels toward the front of the user wearing the electronic eye glasses. Generally, in other words, the user wearing the electronic eye glasses sits in front of the displaying unit to which an emitting element emits light. Thus the infrared light emitted from the emitting unit travels toward the electronic eye glasses. Consequently, this structure improves the communication performance between the emitting unit and the electronic eye glasses, and reduces malfunctions of the shutters of the electronic eye glasses.

In the organic EL displaying device according to the implementation of the present invention, the scanning line driving circuit may be connected to the pixel units arranged in the N×M matrix via scanning lines provided on a line-by-line basis, and may supply the control signal to the emitting unit via the scanning lines.

According to the implementation, the scanning line driving circuit is connected via scanning lines to the pixel units arranged in the N×M matrix. The scanning lines are provided on a line-by-line basis. Then, the control signal is supplied to the emitting unit through the scanning lines. This structure makes possible controlling the supply of the control signal to the emitting unit with a use of the scanning lines. Thus no control line is required for supplying the control signal to the emitting unit, which contributes to fewer wires in the displaying unit. As a result, the circuit structure of the organic EL display device can be simplified.

In the organic EL displaying device according to the implementation of the present invention, the displaying unit may have the emitting units placed in arrangement positions of the pixel units arranged in the N×M matrix.

According to the implementation, the emitting units are arranged in the displaying unit. This structure can increase a total amount of the infrared light provided from the displaying unit, which can enhance intensity of the infrared light transmitted from the display device. The enhanced intensity of the infrared light contributes to more accurate infrared communication between the display device and the electronic eye glasses, and prevents malfunctions of the shutters of the electronic eye glasses.

In the organic EL displaying device according to the implementation of the present invention, the emitting units may be arranged on one of lines included in a first line through an N-th line arranged in the N×M matrix.

According to the implementation, the emitting units are arranged on one of the lines included in the first line through the nth-line arranged in the N×M matrix. This structure makes possible independently controlling the one line on which the emitting units are arranged and each of the lines on which pixel units 136 are arranged, contributing to further simplification of controlling the pixel units and the emitting units.

In the organic EL displaying device according to the implementation of the present invention, the emitting units arranged on the one line may be arranged on the first line in the N×M matrix.

Consider the case where, in the displaying unit, the one line having the emitting units arranged does not provide infrared light suitable to the video signal. When the emitting units are provided to another line instead of the first line in the displaying unit, the first line divides video generated by the pixel units arranged in the N×M matrix. This problem interferes with display of smooth video.

According to the implementation, the emitting units are arranged on the first line in the N×M matrix. Here, the emitting units are arranged on the first line in the matrix. This structure (i) prevents the video generated by the pixel units arranged in the N×M matrix from being divided by the one line having the emitting units 138, and (ii) allows the emitting units to be included in the organic EL display device in order to improve a communication performance between the emitting units and the electronic eye glasses.

The organic EL displaying device according to the implementation of the present invention may further include: a signal processing unit which (i) receives a video signal from outside, and (ii) generates from the video signal an identifying signal identifying whether the video signal represents the first frame or the second frame; and a signal generating unit which generates the control signal based on the identifying signal.

According to the implementation, the organic EL display device includes a signal generating unit generating the control signal.

In the organic EL displaying device according to the implementation of the present invention, the signal generating unit may be included in the scanning line driving circuit.

According to the implementation, the signal generating unit is included in the scanning line driving circuit.

In the organic EL displaying device according to the implementation of the present invention, the signal generating unit may generate the control signal such that the number of times which the predetermined element emits the infrared light differs between the first frame and the second frame.

According to the implementation, the signal generating unit generates the control signal such that the number of times which said predetermined element emits the infrared light differs between the first frame and the second frame. Hence, the number of times which the predetermined element emits the infrared light differs between the first frame and the second frame. Based on the number of times, the electronic eye glasses can easily determine which eye's shutter should be closed. Consequently, this structure can simplify the opening and closing control of the shutters of the electronic eye glasses.

In the organic EL displaying device according to the implementation of the present invention, the signal generating unit may generate the control signal such that (i) the control signal causes the predetermined element to emit the infrared light twice when the video signal represents the first frame, and (ii) the control signal controls the predetermined element to emit the infrared light once when the video signal represents the second frame.

According to the implementation, the control signal cause the predetermined element to emit the infrared light (i) twice in the first frame when the video signal represents the first frame, and (ii) once in the second frame when the video signal represents the second frame. This structure allows the electronic eye glasses to determine whether the electronic eye glasses receive the infrared light twice or once within a predetermined period, so that the electronic eye glasses can easily determine the shutter for which eye should be closed.

The organic EL displaying device according to the implementation of the present invention may further include: a control unit which supplies the video signal to the data line driving circuit, and the scanning signal to the scanning line driving circuit, wherein the signal generating unit may generate the control signal by receiving (i) the identifying signal from the control unit and (ii) each of scanning signals supplied from the control unit to the scanning line driving circuit, and by adding the identifying signal to the scanning signal, the scanning signals being supplied to at least two lines included in a first line through an N-th line arranged in the N×M matrix except the one line on which the emitting units are arranged.

In the implementation, the signal generating unit generates the control signal by receiving to add each of scanning signals supplied to at least two lines included in a first line through an N-th line arranged in the N×M matrix except the one line on which the emitting units are arranged. This structure allows the control signal to be generated out of the scanning signal supplied to the scanning line driving circuit, which needs no designated driver for generating the control signal in order to generate the control signal. As a result, the circuit structure of the device can be simplified and the manufacturing cost can be reduced In the organic EL displaying device according to the implementation of the present invention, when there is a predetermined line (i) included in the first line through the N-th line arranged in the N×M matrix and (ii) on which the emitting units and the pixel units are arranged mixed, the signal generating unit may supply to the scanning line driving circuit the control signal to be used in the predetermined line, and the scanning line driving circuit may supply the control signal to be used in the predetermined line to the emitting units and the pixel units both arranged in the predetermined line, the control signal being supplied via a scanning signal connected to the predetermined line.

In the implementation, when there is a predetermined line on which the emitting units and the pixel units are arranged mixed the scanning line driving circuit uses a scanning signal connected to the predetermined line to supply the control signal to be used in the predetermined line to the emitting units and the pixel units both arranged in the predetermined line. In other words, the pixel units use the control signal as the scanning signal. Hence the pixel units and the emitting units arranged on the predetermined line can be controlled through the scanning line, eliminating the need for separating control lines for the pixel units and for the emitting units. This structure contributes to fewer wires and a simpler circuit structure in the displaying unit.

In the organic EL displaying device according to the implementation of the present invention, when there is a predetermined line (i) included in any of the first line through the N-th line in the N×M matrix and (ii) on which the emitting units and the pixel units are arranged mixed, the signal generating unit may generate a control signal to be used in the predetermined line, and may supply the control signal to the scanning line driving circuit, the control signal being generated such that (i) the predetermined element emits infrared light once in a single frame and (ii) an emitting period of the predetermined element differs between the first frame and the second frame depending on whether the identifying signal identifies the first frame or the second frame.

In the case where (i) the displaying unit has a predetermined line on which the emitting units and the pixel units are arranged mixed, and (ii) both of the pixel units and the emitting units are controlled via an existing scanning line, the signal generating unit is to supply the control signal to both of the emitting units and the pixel units. Here, when the control signal is supplied twice or more to the emitting units, the video signal is written twice or more to the pixel units arranged on the predetermined line as well. This could cause an undesirable outcome such that a luminescent element included in each of the pixel units emits the visible light twice or more per frame. In this case, it is impossible to control and differ the number of times which the predetermined element emits the infrared light between the first frame and the second frame.

In the implementation, when there is a predetermined line on which the emitting units and the pixel units are arranged mixed, the signal generating unit generates a control signal to be used in the predetermined line such that (i) the predetermined element emits infrared light once in a single frame and (ii) an emitting period of the predetermined element differs between the first frame and the second frame. In the above structure, the emitting period of the predetermined element differs between the first frame and the second frame. Thus even though the predetermined element emits the infrared light once, the electronic eye glasses can determine which shutter; namely the right-eye shutter or the left-eye shutter, should be closed based on the difference in the emitting period. As a result, the emission of infrared light from the predetermined element can be appropriately controlled through an existing scanning line even in the case where the emitting units and the pixel units are arranged mixed on a predetermined line.

In the organic EL displaying device according to the implementation of the present invention, the scanning line driving circuit may provide the supplied control signal to the emitting units arranged in the predetermined line, and may control the emitting period of the predetermined element such that the emitting period differs between the first frame and the second frame, the predetermined element being included in each emitting unit arranged on the predetermined line.

In the implementation, when there is a predetermined line having the emitting units and the pixel units arranged mixed, the scanning line driving circuit provides the supplied control signal to the emitting units arranged in the predetermined line, and controls the emitting period of the predetermined element included in each emitting unit such that the emitting period differs between the first frame and the second frame. According to the structure, the first frame and the second frame have a different emitting period of the infrared light provided from the predetermined element included in each emitting unit. Hence, the electronic eye glasses can determine which shutter; namely the right-eye shutter or the left-eye shutter, should be closed based on the difference in the emitting period of the infrared light.

In the organic EL displaying device according to the implementation of the present invention, the scanning line driving circuit may provide the supplied control signal, as the scanning signal, to the pixel units arranged on the predetermined line so as to control the supply of the image signal to the pixel units.

In the implementation, when there is a predetermined line having the emitting units and the pixel units arranged mixed, the scanning line driving circuit provides the control signal, as the scanning signal, to the pixel units arranged on the predetermined line. According to the above structure, the video signal is supplied once per frame to the pixel units arranged on the predetermined line. This contributes to appropriate control of the emission of the visible light from the luminescent element included in each pixel unit included in the predetermined line.

In the organic EL displaying device according to the implementation of the present invention, when there is a predetermined line (i) included in any of the first line through the N-th line and (ii) on which the emitting units and the pixel units are arranged mixed, the signal generating unit may generate the control signal to be used in the predetermined line, and may supply the control signal to the scanning line driving circuit, the control signal being generated such that (i) the predetermined element emits infrared light once in a single frame and (ii) an emitting period of the predetermined element is longer for the first frame than for the second frame depending on the case where the identifying signal is indicating which of the first frame or the second frame.

In the implementation, when there is a predetermined line having the emitting units and the pixel units arranged mixed, the signal generating unit generates the control signal to be used in the predetermined line such that (i) the predetermined element emits infrared light once in a single frame and (ii) an emitting period of the predetermined element is longer for the first frame than for the second frame.

In the organic EL displaying device according to the implementation of the present invention, the scanning line driving circuit may provide the supplied control signal to the emitting units arranged in the predetermined line, and may control the emitting period of the predetermined element such that the emitting period is longer for the first frame than for the second frame, the predetermined element being included in each emitting units arranged on the predetermined line.

In the implementation, the scanning line driving circuit causes the predetermined element, included in each emitting units arranged on the predetermined line, to emit the infrared light such that the emitting period is longer for the first frame than for the second frame. According to the structure, the electronic eye glasses can determine which eye's shutter should be closed based on the duration of the emitting period of the predetermined element.

In the organic EL displaying device according to the implementation of the present invention, the scanning line driving circuit may provide the supplied control signal, as the scanning signal, to the pixel units arranged on the predetermined line such that a supplying period of the video signal to the pixel units is longer for the first frame than for the second frame.

In the implementation, the supplying period of the video signal to the pixel units is longer for the first frame than for the second frame. According to the above structure, the video signal is supplied once per frame to the pixel units arranged on the predetermined line. This contributes to appropriate control of the emission of the visible light from luminescent element included in each pixel unit included in the predetermined line.

In the organic EL displaying device according to the implementation of the present invention, a surface area of the driving element included in each of the emitting units is greater than a surface area of the driving element included in each of the pixel units.

The amount of a current causing the predetermined element to emit the infrared light needs to be significantly greater than that that of a current required to cause the luminescent element to emit the visible light. Accordingly, the driving element for driving the luminescent element cannot run an enough amount of current in order to cause the predetermined element to emit the infrared light.

In the implementation, a surface area of the driving element included in each of said emitting units is greater than a surface area of the driving element included in each of said pixel units. This structure can increase the current amount running into the predetermined element, which makes possible causing the predetermined element to emit the infrared light.

In the organic EL displaying device according to the implementation of the present invention, a scanning line representing the one line on which the emitting units are arranged may be connected to a gate electrode of the driving element included in the emitting unit, and the scanning line driving circuit may cause the predetermined element to emit the infrared light when supplying the control signal to the gate electrode of the driving element included in the emitting unit.

In the implementation, the scanning line driving circuit causes the predetermined element to emit the infrared light when the control signal is supplied to the gate electrode of the driving element included in the emitting unit. According to the structure, the predetermined element emits the infrared light when the control signal is supplied to the emitting unit, which contributes to the transmission of the control signal at the right time for the electronic eye glasses. As a result, the opening and closing control of the electronic eye glasses' shutter can be appropriately timed.

An image displaying system according to another implementation of the present invention includes: an organic EL display device; and eye glasses equipped with electronic shutters. The organic EL display device may include: pixel units each of which includes a luminescent element which emits visible light and a driving element which drives the luminescent element; a displaying unit which has the pixel units arranged in an N×M matrix; a data line driving circuit which supplies a video signal to each of the pixel units arranged in the displaying unit, the video signal constructing three-dimensional video out of a first frame and a second frame respectively corresponding to right-eye image information and to left-eye image information of the three-dimensional video; and a scanning line driving circuit which supplies a scanning signal to each of the pixel units so as to control the supply of the video signal to each of the pixel units, the displaying unit may include one or more emitting units including a predetermined element that emits infrared light, and a driving element which drives the predetermined element, the scanning line driving circuit may (i) supply to the emitting unit a control signal indicating switching timing between the first frame and the second frame, and (ii) cause the predetermined element, included in the emitting unit, to emit the infrared light based on the control signal, the eye glasses equipped with electronic shutters may include: a shutter for one eye; a shutter for an other eye; a communications unit which receives the infrared light emitted from the predetermined element; and a control unit which controls opening and closing of the shutters for the one eye and the other eye in response to the communications unit receiving the infrared light, and, instead of the pixel units, the displaying unit may include the one or more emitting units (i) placed in at least one of arrangement positions of the pixel units arranged in the N×M matrix, and (ii) including the predetermined element of which infrared light travels in a same direction as the visible light of the luminescent element, and the driving element which drives the predetermined element.

According to the implementation, the video display system includes the organic EL display device.

In addition the present invention may be introduced as a video display method used for the video display system, instead of the organic EL display device and the video display system.

Embodiment 1

Hereinafter, an organic EL display device, a video display system, and a video display method according to Embodiment 1 in the present invention shall be described with reference to the drawings.

FIG. 1 (A) is a perspective view exemplifying an appearance of a video display system 100 according to Embodiment 1 in the present invention. The video display system 100, which can display three-dimensional video, includes an organic EL display device 1 and the electronic eye glasses 7.

The video display system 100 is similar to the conventional video display system 900 illustrated in FIG. 11 in that both of the systems use an infrared signal to synchronize switching timing between the frames of the left eye and the right eye between the organic EL display device 1 and the electronic eye glasses 7. The video display system 100, however, has no emitter acting as an external unit or a discrete unit because of a characteristic structure described hereinafter.

The organic EL display device 1 is equipped with, for example, an organic EL displaying panel as a displaying unit 13. As described later, the displaying unit 13 has pixel positions designated in an N×M matrix. In particular, the matrix of one or more pixel positions included in a predetermined row 133 have infrared-light-emittable one or more emitting units, instead of a pixel unit capable of emitting visible light.

FIG. 1 (B) is a functional block diagram exemplifying a functional structure of a substantial part of the organic EL display device 1.

The organic EL display device 1 includes a signal processing unit 11, a control unit 12, the displaying unit 13, and a signal generating unit 14. The present invention shall not be limited to a specific embodiment for implementing the signal processing unit 11, the control unit 12, the displaying unit 13, and the signal generating unit 14. As an example, the signal processing unit 11, the control unit 12, the displaying unit 13, and the signal generating unit 14 may be introduced as (i) functions of software executed by a central processing unit (CPU) and a digital signal processor (DSP) running a predetermined program, and (ii) a hardware circuit with a use of an application specific integrated circuit (ASIC).

The signal processing unit 11 obtains a video signal, and supplies the obtained video signal to the control unit 12. Here, the video signal includes (i) image information indicating a first frame and a second frame respectively corresponding to a left-eye image and a right-eye image of three-dimensional video, (ii) an identifying signal showing that the image information is indicating which of the first frame or the second frame, and (iii) a synchronizing signal (a vertical synchronizing signal) indicating a period of each frame. The signal processing unit 11 also extracts the synchronizing signal and the identifying signal from the video signal, and supplies the extracted synchronizing signal and identifying signal to the signal generating unit 14.

The control unit 12 supplies (i) the video signal obtained out of the signal processing unit 11 to a data line driving circuit 132 in the displaying unit 13, and (ii) a scanning signal to a scanning line driving circuit 131 in the displaying unit 13.

The signal generating unit 14 (i) generates a control signal out of the synchronizing signal and the identifying signal obtained from the signal processing unit 11, and (ii) supplies the generated control signal to the scanning line driving circuit 131 in the displaying unit 13. Here, the control signal indicates the switching timing between the first frame and the second frame.

Hereinafter, the displaying unit 13 shall be described in detail.

FIG. 2 (A) is a functional block diagram exemplifying a functional structure of the displaying unit 13. The displaying unit 13 may be, for example, an organic EL display panel.

The displaying unit 13 has pixel positions designated in a matrix. Except the pixel positions included in the row 133, the matrix of each pixel position has a visible-light-emittable pixel unit 136. In each pixel position included in the row 133, an infrared-light-emittable emitting unit 138 is provided instead of the pixel unit 136. In this example, the row 133 is the first line in the matrix. The emitting units 138 are placed in all the pixel positions included in the first line.

Here, the emitting units 138 are arranged on the row 133 which is the first line in the matrix. This structure (i) prevents video generated by the pixel units arranged in the N×M matrix from being divided by the row 133 having the emitting units 138, and (ii) allows the emitting units 138 to be included in the organic EL display device 1 in order to improve a communication performance between the emitting units 138 and the electronic eye glasses 7.

Furthermore, the displaying unit 13 includes the following: a scanning line 134 and a data line 135 respectively arranged for each row and each column in a matrix, the scanning line driving circuit 131, and the data line driving circuit 132. The scanning line driving circuit 131 and the data line driving circuit 132 may be integrated circuit (IC) units (semiconductor IC devices) provided on the organic EL display panel as the displaying unit 13, for example.

Depending on the video signal obtained from the control unit 12, the data line driving circuit 132 sequentially generates a data signal for each row, the data signal which indicates emission intensity of each pixel unit 136. Then, the data line driving circuit 132 provides the generated data signals to the data line 135.

When the data line driving circuit 132 sequentially provides the data signal for each row to the data line 135, the scanning line driving circuit 131 synchronizes to the sequential provision so as to provide the scanning signal obtained out of the control unit 12 to the scanning line 134 in the row having the pixel unit 136 which is supposed to obtain the data signal. The scanning line driving circuit 131 also provides the control signal obtained out of the signal generating unit 14 to a scanning line 137 in the row 133 having the emitting units 138.

The pixel unit 136 obtains the data signal to be supplied from the data line driving circuit 132 depending on the supply of the scanning signal from the scanning line driving circuit 131. Then, the pixel unit 136 emits visible light in the luminance which is based on the obtained data signal.

The emitting units 138 emit an infrared light while the scanning line driving circuit 131 supplies the control signal. Here, the emitting units 138 are arranged in pixel positions included in the row 133 having some of the pixel positions arranged in a matrix. Therefore, the emitting direction of the light from the pixel unit 136 is the same as that of the infrared light from the predetermined emitting unit 138. As a result, the infrared light emitted from the emitting unit 138 travels toward the front of the user wearing the electronic eye glasses. Generally, in other words, the user wearing the electronic eye glasses sits in front of the displaying unit 13 to which an emitting element emits light. Thus, the infrared light emitted from the emitting unit 138 travels for the electronic eye glasses 7. Consequently, this structure improves the communication performance between the emitting units 138 and the electronic eye glasses 7, and reduces malfunctions of the shutters of the electronic eye glasses 7.

In the displaying unit 13, a power line (not shown) is provided. The power line is used for supplying electricity for emitting visible light and infrared light to each pixel unit 136 and each emitting unit 138, respectively.

According to Embodiment 1, the emitting units 138 are placed in some of arrangement positions of the pixel units 136 arranged in the matrix within the displaying unit 13. Here, each emitting unit 138 has a predetermined element, instead of the pixel unit 136, emitting infrared light, and a driving element driving the predetermined element. Then, the scanning line driving circuit 131 supplies to the emitting unit 138 the control signal indicating the switching timing between the first frame and the second frame which display the three-dimensional video. The scanning line driving circuit 131 causes the predetermined element to emit the infrared light based on the control signal. In other words, the emitting unit 138 provides the control signal as infrared light to be emitted from the predetermined element.

The above structure allows the emitting units 138 included in the organic EL display device 1 and the electronic eye glasses 7 to establish infrared communication, which makes possible opening and closing control of the shutters of the electronic eye glasses 7. Accordingly, an emitter, which is used to be an external unit, can be built in the organic EL display device 1 as the emitting units 138. This eliminates the trouble of setting up and connecting a separate emitter to the organic EL display device 1.

In Embodiment 1, moreover, the emitting units 138, instead of the pixel units 136, are placed in some of arrangement positions of the pixel units 136 arranged in the matrix. As lines provided to the scanning line driving circuit 131 and each of the pixel units 136, the scanning lines 134 and 137 can be shared with the pixel units 136 and the emitting units 138, the scanning line driving circuit 131 which controls the supply of the video signal to each pixel unit 136. Thus, no extra driver is required for driving the emitting units 138, which contributes to a more simple circuit structure of the organic EL display device 1. As a result, the manufacturing cost of the organic EL display device 1 can be reduced.

FIG. 2 (B) is a circuit diagram exemplifying a functional structure of the pixel unit 136.

The pixel unit 136 includes transistors TR1 and TR2, a capacitor C, and an organic EL element EL, and is connected to the scanning line 134 and the data line 135. When the scanning signal is supplied from the scanning line 134, the transistor TR1 turns on to hold the data signal supplied to the data line 135 in the capacitor C. The transistor TR2 uses a current based on the data signal held in the capacitor C to drive the organic EL element EL in order to illuminate the organic EL element EL with desired luminance. The power to illuminate the organic EL element EL is supplied from power lines VDD and VSS.

FIG. 2 (C) is a circuit diagram exemplifying a functional structure of the emitting unit 138.

The emitting unit 138 includes a transistor TR3 and an infrared emitting element IR, and is connected to the scanning line 137. When the scanning signal is supplied from the scanning line 137, the transistor TR3 turns on to illuminate the infrared emitting element IR. The power to illuminate the infrared emitting element IR is supplied from the power lines VDD and VSS.

In order to emit infrared light having sufficient intensity toward the electronic eye glasses 7, the infrared emitting element IR in the emitting unit 138 requires a driving current greater than that for driving the organic EL element EL in the pixel unit 136. Therefore, it is desirable that the surface area of the transistor TR3 in the emitting unit 138 is greater than that of the transistor TR2 in the pixel unit 136.

Next, an operation of the organic EL display device 1 structured above shall be described.

FIG. 3 is a timing diagram exemplifying an operation of the organic EL display device 1.

The bar shown on the top of FIG. 3 schematically illustrates a temporal relationship between details of an image displayed on each row of the displaying unit 13 and shutter control of the electronic eye glasses 7. Here, a row position in the displaying unit 13 corresponds to a top position and a bottom position in the bar. In other words, an electronic shutter is closed when a new frame (the left-eye image or the right-eye image) starts to be displayed, and the displayed image of each row is sequentially changed from a row on the top to a row on the bottom of the displaying unit 13. When the displayed images of all the rows are replaced with images of the new frame, the electronic shutter is re-opened.

The rest of the illustration in FIG. 3 shows the details of main signals used in the organic EL display device 1.

The synchronizing signal and the identifying signal are extracted from the video signal by the signal processing unit 11, and supplied to the signal generating unit 14. The synchronizing signal indicates the start of a frame. The identifying signal indicates in the high-level or the low-level whether the started frame is either the first frame corresponding to the right-eye image or the second frame corresponding to the left-eye image, respectively.

The scanning signal is generated by the control unit 12, distributed to each of the rows except the row 133 by the scanning line driving circuit 131, and supplied to the pixel unit 136 via the scanning line 134 corresponding to the row.

The control signal is generated by the signal generating unit 14, and supplied from the scanning line driving circuit 131 to the emitting unit 138 via the scanning line 137 in the row 133.

In Embodiment 1, the scanning line driving circuit 131 is connected via the scanning line 137 to the pixel units 136 arranged in the N×M matrix. The scanning line is one of the scanning lines provided on a line-by-line basis. Then, the control signal is supplied to the emitting units 138 through the scanning line 137. This structure makes possible controlling the supply of the control signal to the emitting unit 138 with a use of the scanning line 137. Thus no control line is required for supplying the control signal to the emitting unit 138, contributes to fewer wires in the displaying unit.

Triggered by the synchronizing signal, in addition, the control signal is provided (i) twice for the first frame, used for the right eye, of which identifying signal is the low-level, and (ii) once for the second frame, used for the left eye, of which identifying signal is the high-level. As described above, the control signal indicates the switching timing between the first frame and the second frame, depending on the number of times to be provided per frame.

While the control signal is high-level, the emitting unit 138 emits the infrared light. In other words, the emitting unit 138 provides in a form of the infrared light the control signal twice for the first frame used for the right eye, and once for the second frame used for the left eye.

This structure allows the electronic eye glasses 7 to tell whether the electronic eye glasses 7 receive the infrared light twice or once within a predetermined period, so that the electronic eye glasses 7 can easily determine the shutter for which eye should be closed.

Next, the electronic eye glasses 7 shall be described in detail.

FIG. 4 is a functional block diagram exemplifying a functional structure of a substantial part of the electronic eye glasses 7.

The substantial part of the electronic eye glasses 7 includes a receiving circuit 71, a left liquid crystal shutter 74, and a right liquid crystal shutter 75. The receiving circuit 71 includes a communications unit 72 and a shutter switching unit.

In the receiving circuit 71, the communications unit 72 receives the control signal provided from the organic EL display device 1 in a form of the infrared light, converts the control signal into an electric signal, and supplies the electric signal to a control unit 73. Based on the supplied control signal, the control unit 73 supplies either a left shutter signal or a right shutter signal to the corresponding one of the left liquid crystal shutter 74 and the right liquid crystal shutter 75. Here, the left shutter signal and the right shutter signal respectively give instructions for opening and closing of the left liquid crystal shutter 74 and the right liquid crystal shutter 75.

Next, an operation of the electronic eye glasses 7 structured above shall be described with reference to FIGS. 5 and 6.

Figure 5:
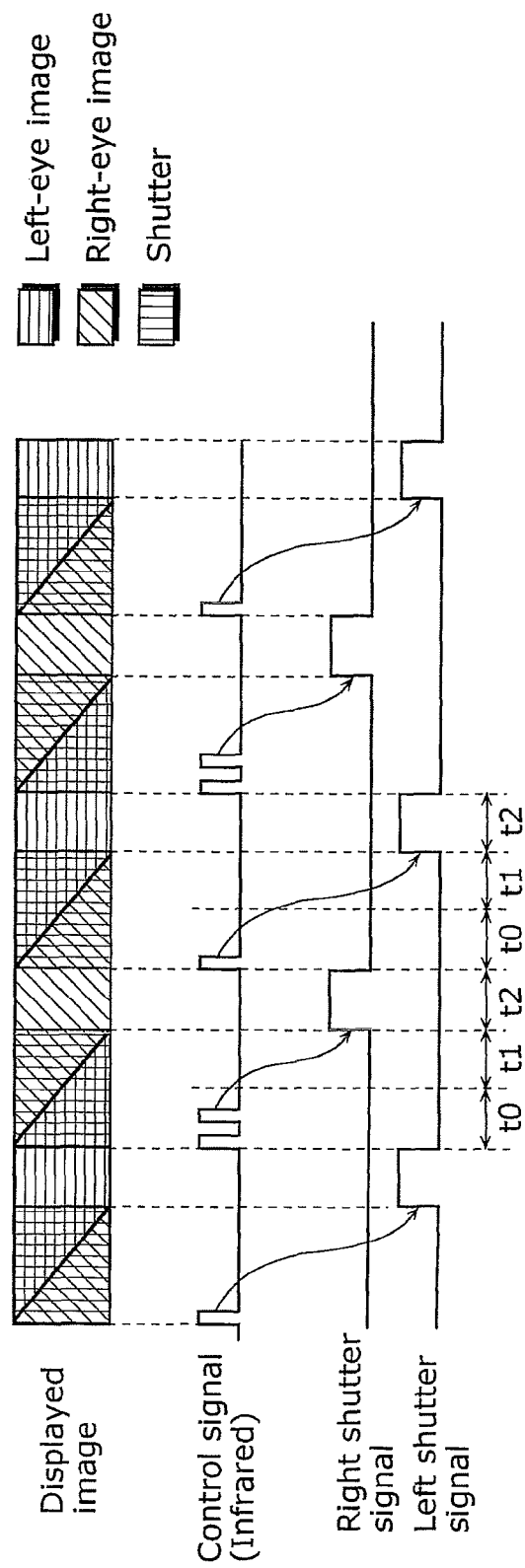
FIG. 5 is a timing diagram exemplifying an operation of the electronic eye glasses according to Embodiment 1 in the present invention.

FIG. 5 is a timing diagram exemplifying an operation of the electronic eye glasses 7. The bar shown on the top of FIG. 5 is that shown in FIG. 3 for the sake of understanding. The rest of the illustration in FIG. 5 shows the details of main signals used in the electronic eye glasses 7.

Figure 6:
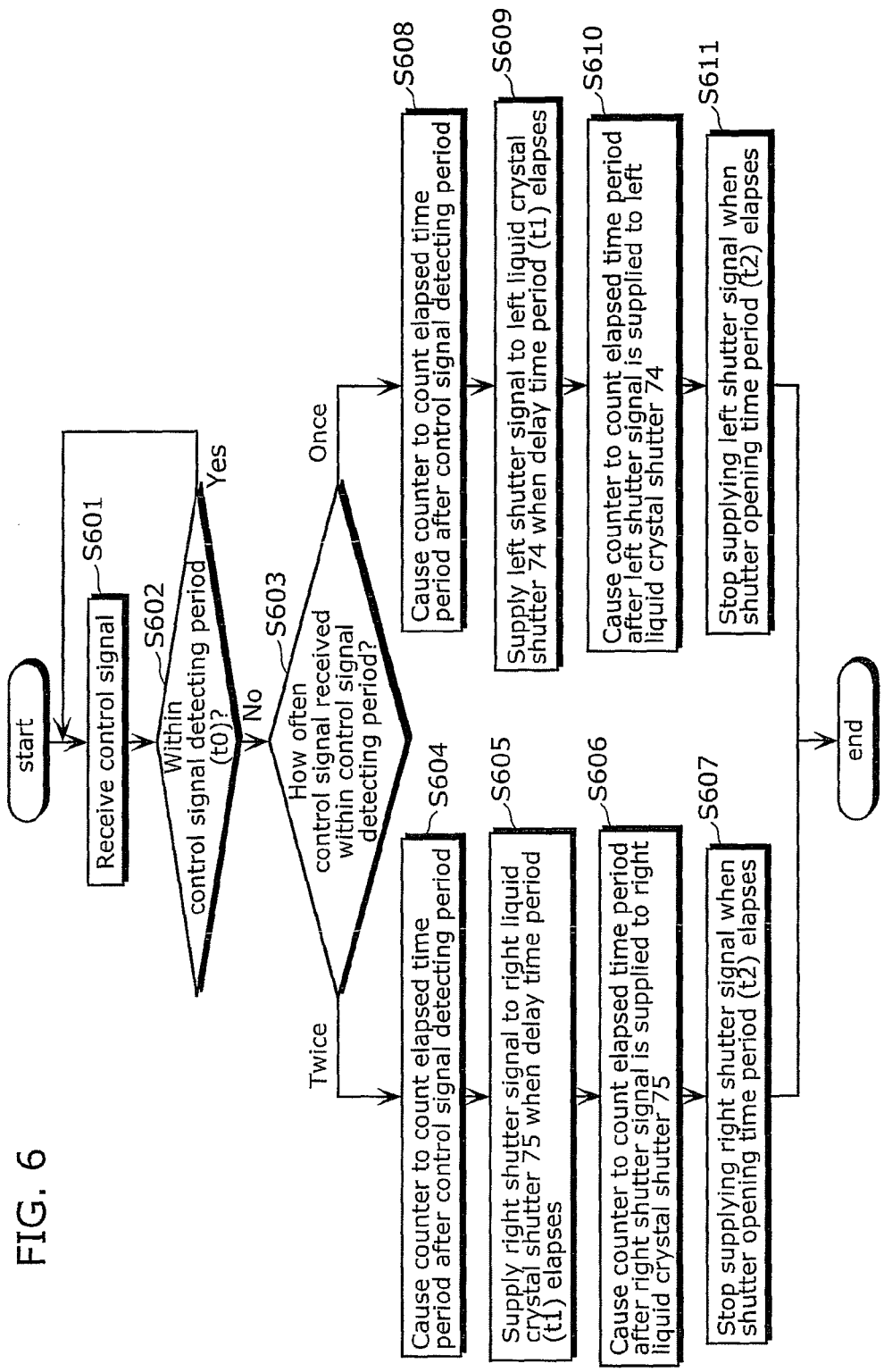
FIG. 6 is a flowchart exemplifying an operation of the electronic eye glasses according to Embodiment 1 in the present invention.

FIG. 6 is a flowchart exemplifying an operation of the electronic eye glasses 7.

The control signal (infrared light) is received and converted into the electric signal by the communications unit 72. Then, the control signal converted into the electric signal is provided to the control unit 73.

Upon receiving the control signal, the control unit 73 generates the right shutter signal or the left shutter signal, and supplies the generated signal to one of the left liquid crystal shutter 74 and the right liquid crystal shutter 75. The control unit 73 controls the opening and closing of the right and left shutters by controlling the supply of the shutter signal. For example, the control unit 73 is equipped with a counter. The control unit 73 has the following periods previously set: a control signal detecting period (t0), a delay time period (t1) from the reception of the control signal to the provision of the shutter signal, and a shutter opening time period (t2) from the opening to the closing of the liquid crystal shutter.

First, the control unit 73 receives the control signal within the control signal detecting period (t0) (S601 to S602). Then, the control unit 73 determines how often the control unit 73 has received the control signal within the control signal detecting period (t0) in order to determine which signal to be generated, the right shutter signal or the left shutter signal (S603). For example, the control unit 73 determines to generate (i) the right shutter signal when receiving the control signal twice within a predetermined time period, and (ii) the left shutter signal when receiving the control signal once within the predetermined time period.

Then, when receiving the control signal twice within the control signal detecting time period and determining to generate the right shutter signal, the control unit 73 causes the counter to count an elapsed time period after the control signal detecting time period (S604). Then, when the previously set delay time period (t1) elapses after the control signal detecting period, the control unit 73 supplies the right shutter signal to the right liquid crystal shutter 75 to open the right liquid crystal shutter 75 (S605).

Next, the control unit 73 causes the counter to count an elapsed time period after the control unit 73 supplies the right shutter signal to the right liquid crystal shutter 75 (S606). When the previously set shutter opening time period (t2) elapses, the control unit 73 stops supplying the right shutter signal, and closes the right liquid crystal shutter 75 (S607).

Concurrently, in the case where the control unit 73 receives the control signal once within the control signal detecting period (t0), and determines to generate the left shutter signal in S602, the control unit 73 carries out schemes similar to S604 to S607 described above. The control unit 73 causes the counter to count an elapsed time period after the control signal detecting period (S608). When the predetermined delay time period (t1) elapses after the detection of the control signal for the left eye, the control unit 73 supplies the left shutter signal to the left liquid crystal shutter 74 to open the left liquid crystal shutter 74 (S609).

Next, the control unit 73 causes the counter to count an elapsed time period after the control unit 73 supplies the left shutter signal to the left liquid crystal shutter 74 (S610). When the previously set shutter opening time period (t2) elapses, the control unit 73 stops supplying the left shutter signal, and closes the left liquid crystal shutter 74 (S611).

Described above is the opening and closing operation of the shutters of the electronic eye glasses 7. In Embodiment 1, the opening and closing of the right and left shutters of the electronic eye glasses 7 can be controlled based on the number of times the control unit 73 has received the control signal.

This structure can simplify the opening and closing control of the shutters of the electronic eye glasses 7.

Next, an organic EL display device 1a shall be described. The organic EL display device 1a includes a signal generating unit 14a which the signal generating unit 14 is more specified. The above signal generating unit 14 has been detailed from a functional point of view. On the signal generating unit 14a, a specific circuit structure thereof shall be exemplified.

Figure 7:
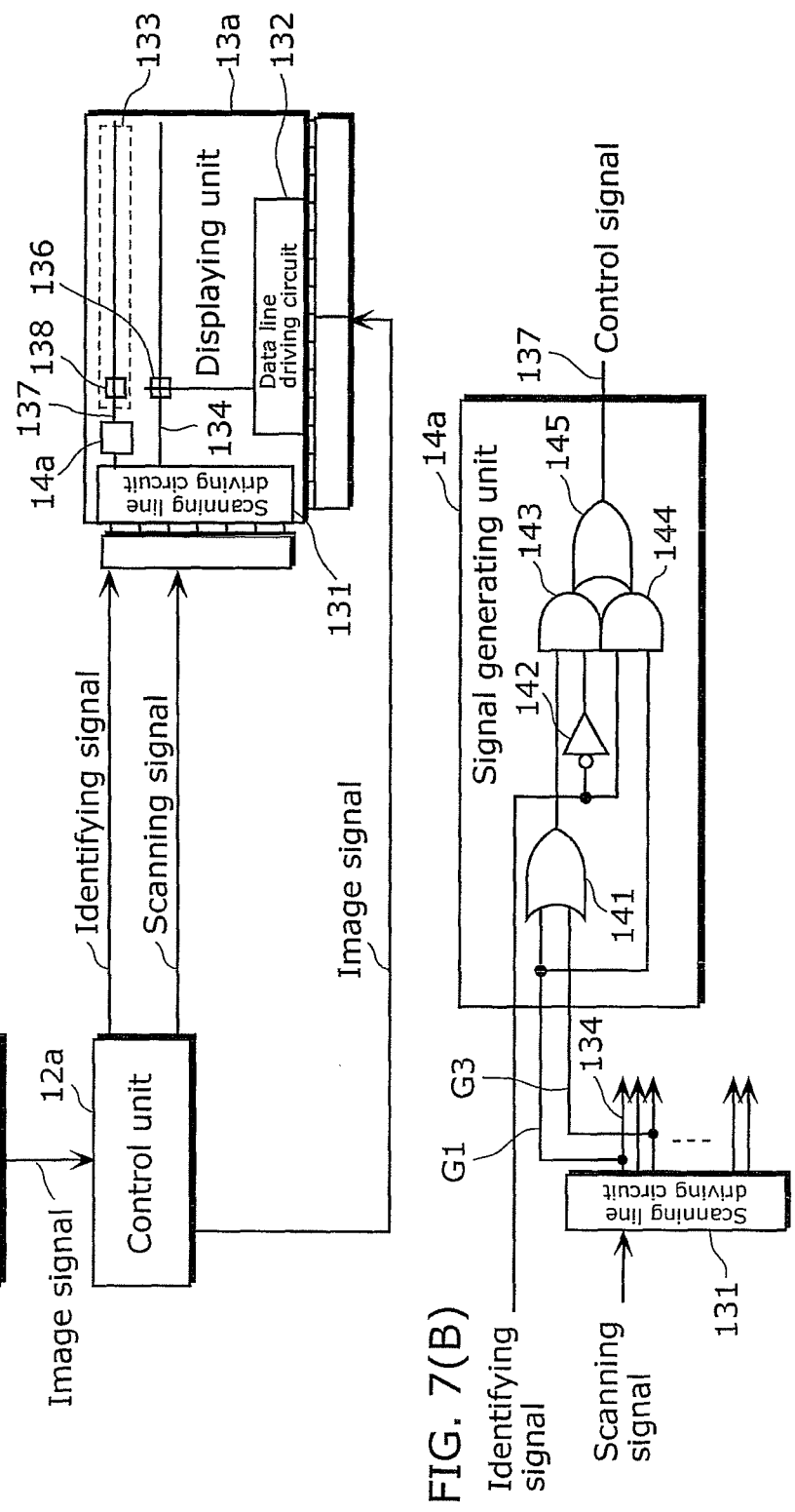
FIG. 7 (A) is a functional block diagram exemplifying a functional structure of the organic EL display device according to a specific example of Embodiment 1 in the present invention.

FIG. 7 (A) is a functional block diagram exemplifying a functional structure of a substantial part of the organic EL display device 1a including the specified signal generating unit 14a. The signal generating unit 14a is built in a displaying unit 13a. As an additional circuit, the signal generating unit 14a can be included in an IC unit used for the scanning line driving circuit 131, for example.

In order to create the above structure, a modification is made to the organic EL display device 1a so that, different from the organic EL display device 1, the organic EL display device 1a uses the control unit 12a to extract the identifying signal from the video signal, and to supply the extracted identifying signal to the signal generating unit 14a.

FIG. 7 (B) is a circuit diagram showing a specific example of the signal generating unit 14a.

The signal generating unit 14a generates the control signal out of an identifying signal and scanning signals G1 and G3, and provides the generated control signal to the scanning line 137. Here, the identifying signal is supplied from the control unit 12a, and the scanning signals G1 and G3 are provided from the scanning line driving circuit 131 to two different rows in a matrix other than the row 133.

As shown in FIG. 7 (B), the signal generating unit 14a is a logic circuit including two OR gates 141 and 145, an inverter 142, and two AND gates 143 and 144. For the first frame which is used for the right eye and whose identifying signal is the low level, the signal generating unit 14a adds scanning signals G1 and G3 to output an OR signal of the scanning signal G1 and G3. For the second frame which is used for the left eye and whose identifying signal is the high-level, the signal generating unit 14a outputs a scanning signal G1.

Based on the control signal generated above, the emitting unit 138 provides the control signal toward the electronic eye glasses 7 in a form of infrared light. Here, the control signal is provided twice for the first frame used for the right eye and once for the second frame used for the left eye.

In Embodiment 1, the control signal is generated out of the received and added scanning signals. The scanning signals are supplied to at least two lines (i) included in the first line through the n-th line arranged in the N×M matrix, and (ii) except the one line on which the emitting units 138 are arranged. This structure allows the control signal to be generated out of the scanning signal supplied to the scanning line driving circuit 131, which needs no designated driver for generating the control signal in order to generate the control signal. As a result, the circuit structure of the device can be simplified and the manufacturing cost can be reduced.

It is noted that in Embodiment 1, all of the pixel positions included in the first row have the emitting units 138. Concurrently, the emitting units 138 may be arranged on one of the lines included in the first line through the nth-line arranged in the N×M matrix. This structure makes possible independently controlling the one line on which the emitting units 138 are arranged and each of the lines on which pixel units 136 are arranged, contributing to further simplification of controlling the pixel units 136 and the emitting units 138.

Embodiment 2

Hereinafter, an organic EL display device, a video display system, and a video display method according to Embodiment 2 in the present invention shall be described with reference to the drawings.

Figure 8:
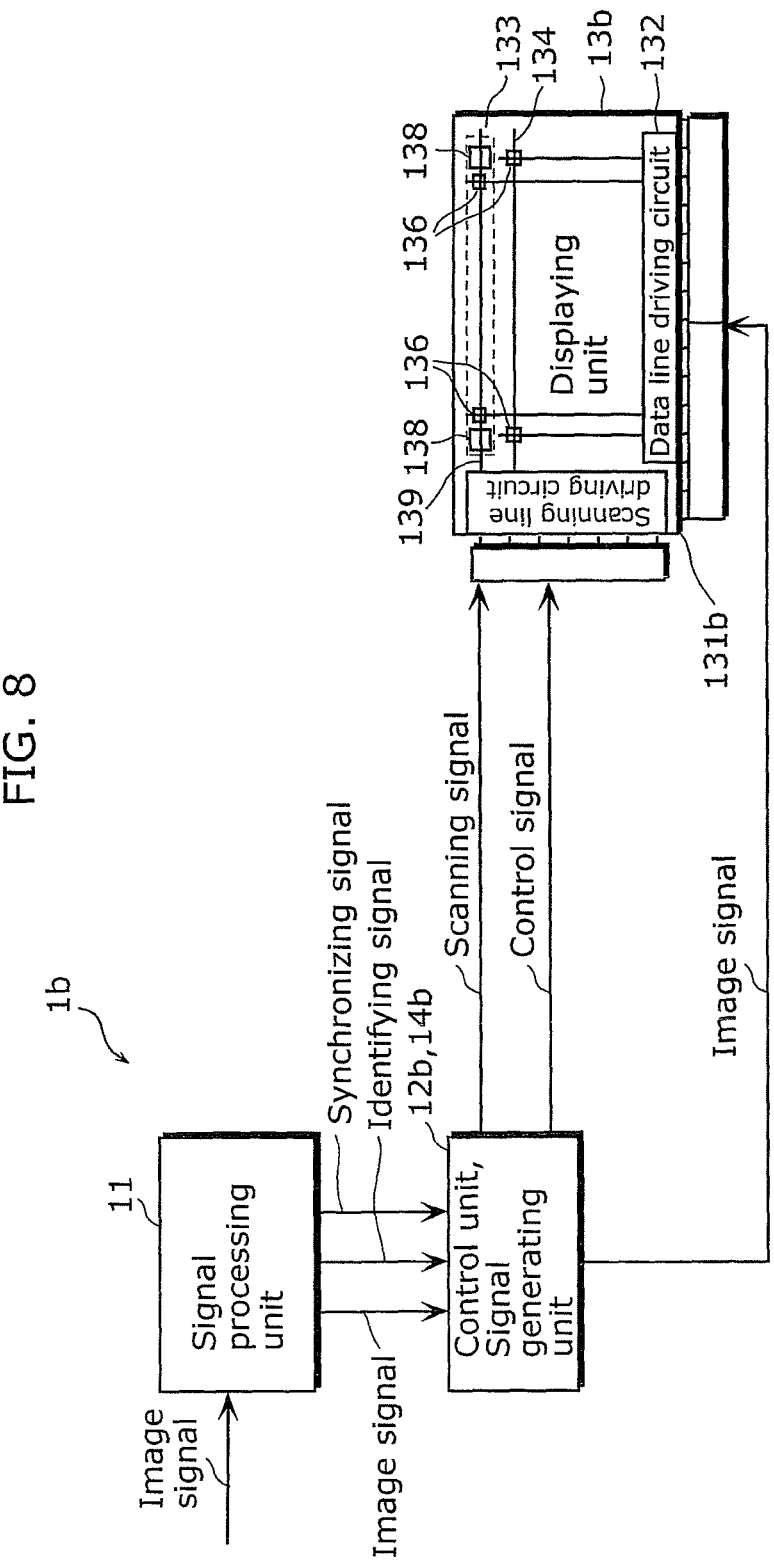
FIG. 8 is a functional block diagram exemplifying a functional structure of an organic EL display device according to Embodiment 2 in the present invention.

FIG. 8 is a functional block diagram exemplifying a functional structure of a substantial part of an organic EL display device 1b according to Embodiment 2 in the present invention. Compared with the organic EL display devices 1 and 1a according to Embodiment 1, the organic EL display device 1b differs in that (i) the switching timing between the first frame for the right eye and the second frame for the left eye is indicated in control signals having different length, and (ii) the pixel units 136 and the emitting units 138 are placed mixed on the predetermined row 133 included in a matrix in a displaying unit 13b.

As an example, the row 133 of the displaying unit 13b in the organic EL display device 1b has the emitting unit 138 placed in pixel positions at both ends. The rest of the pixel positions have the pixel units 136. All of the pixel units 136 and the emitting units 138 in the row 133 are commonly connected to a scanning line 139. Through a control signal supplied from the scanning line 139, each of the pixel units 136 receives a data signal and each of the emitting units 138 emits an infrared light.

The above structure of the displaying unit 13b in organic EL display device 1b may cause the following: when the control signal is supplied to each emitting unit 138 twice or more per frame via the scanning line 139, each pixel unit 136 placed on the row 133 also receives a data signal twice or more by the control signal. This could cause an undesirable outcome such that the pixel unit 136 emits the visible light twice or more per frame.

Hence, the signal generating unit 14b in the organic EL display device 1b generates a control signal controlling (i) the number of times which the emitting unit 138 emits the infrared right so that the emitting unit 138 emits the infrared right once per frame for both of the first frame for the right eye and the second frame for the left eye, and (ii) the emitting unit 138 so that the emitting unit 138 emits the infrared right at a different time for the first frame and the second frame.

As such a control signal, for example, the signal generating unit 14b may generate a control signal once for each of the first frame and the second frame. Here, each of the control signals is different in pulse width.

Most of typical organic EL display devices are originally equipped with a variable-length pulse generator generating a pulse signal whose pulse width is variable for various kinds of control. This makes variation in pulse width easy.

Thus, instead of the control unit 12 included in the organic EL display device 1, the organic EL display device 1b uses the control unit 12b additionally having a variable-length pulse generator. Using the variable-length pulse generator as the signal generating unit 14b, the organic EL display device 1b generates the control signal.

The signal generating unit 14b synchronizes to the synchronizing signal supplied from the signal processing unit 11, and generates a control signal whose length is based on the identifying signal supplied from the signal processing unit 11. Then, the signal generating unit 14b supplies the generated control signal to the scanning line driving circuit 131b.

The scanning line driving circuit 131b provides to a scanning line 139 in the row 133 the control signal obtained from the signal generating unit 14b, and sequentially distributes the scanning signal obtained from the signal generating unit 14b to the other scanning line in each row.

Next, an operation of the organic EL display device 1b structured above shall be described.

Figure 9:
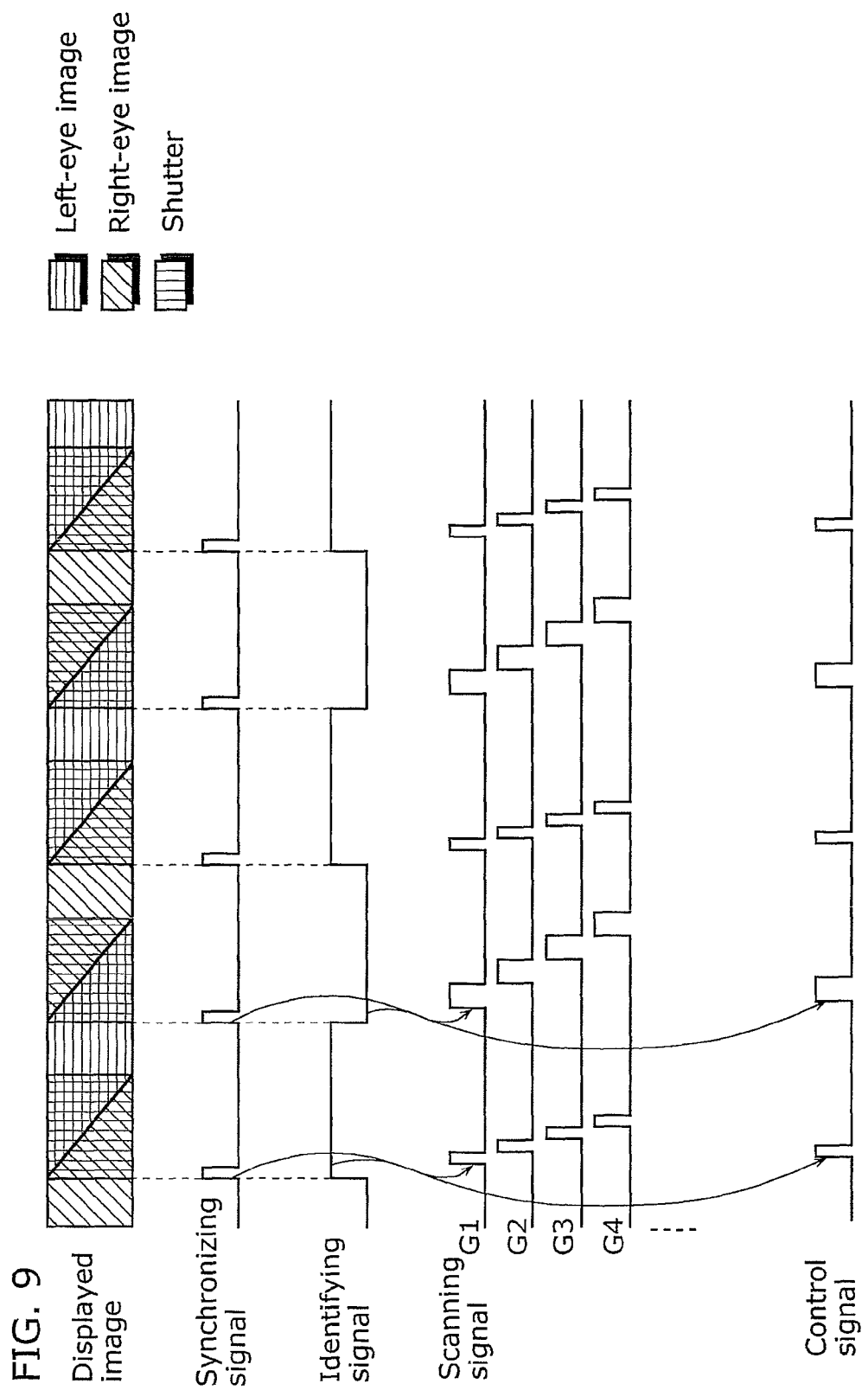
FIG. 9 is a timing diagram exemplifying an operation of the organic EL display device according to Embodiment 2 in the present invention.

FIG. 9 is a timing diagram exemplifying an operation of the organic EL display device 1b.

The bar on the top of FIG. 9 is illustrated in a similar manner as the bar shown on the top of FIG. 9, and schematically shows a temporal relationship between details of an image displayed on each row of the displaying unit 13b and shutter control of the electronic eye glasses 7.

The rest of illustration in FIG. 9 shows the details of main signals used in the organic EL display device 1b.

The synchronizing signal and the identifying signal are extracted from the video signal by the signal processing unit 11, and supplied to the signal generating unit 14b. The synchronizing signal indicates the start of a frame. The identifying signal indicates in the high-level or the low-level whether the started frame is either the first frame corresponding to the right-eye image or the second frame corresponding to the left-eye image, respectively.

The scanning signal is generated by the control unit 12b, distributed to each of the rows except the row 133 by the scanning line driving circuit 131b, and supplied to the pixel unit 136 via the scanning line 134 corresponding to the row.

The control signal is generated by the signal generating unit 14b, and supplied from the scanning line driving circuit 131b to the emitting units 138 and the pixel units 136 via a scanning line 139 in the row 133.

Triggered by the synchronizing signal, the control signal is provided so that the pulse width of the second frame which is for the left eye and whose identifying signal is high-level is greater than the pulse width of the second frame which is for the right eye and whose identifying signal is low-level. As described above, the control signal indicates the switching timing between the first frame and the second frame, depending on difference between pulse widths.

While the control signal is high-level, the emitting unit 138 emits the infrared light. In other words, the emitting unit 138 provides in a form of the infrared light the control signal for a long time for the first frame used for the right eye, and for a short time for the second frame used for the left eye.

It is noted that the above description has distinguished the control signal from the scanning signal; meanwhile, no distinction shall be necessary when the first scanning signal in one frame is regarded as the control signal. For example, the control unit 12b may regard the first scanning signal in one frame as the control signal, and provide all the scanning signal each of which pulse width in the first frame is greater than that in the second frame.

Then, the scanning line driving circuit 131b may obtain the scanning signals from control unit 12a, and distribute the scanning signals to the scanning lines 139 and 134 in all the rows including the row 133.

In Embodiment 2, when the emitting units 138 and the pixel units 136 are arranged mixed on the row 133, the scanning line 139 is used to supply the control signal to be used in the row 133 since the scanning line 139 included in the row 133 is provided to both of the emitting units 138 and the pixel units 136. In other words, the pixel units 136 use the control signal as the scanning signal. Hence the pixel units 136 and the emitting units 138 arranged on the row 133 can be controlled through the scanning line 139, eliminating the need for separating control lines for the pixel units 136 and for the emitting units 138. This structure contributes to fewer wires in the displaying unit and a simpler circuit structure in the displaying unit 13b.

In Embodiment 2, when the emitting units 138 and the pixel units 136 are placed mixed in the row 133, the control signal used in the row 133 is generated such that (i) the emitting unit 138 remains to emit the infrared light once in a single frame and (ii) the emitting period of the emitting unit 138 differs between the first frame and the second frame. According to the structure, the emitting period of the emitting unit 138 differs between the first frame and the second frame. Hence, the electronic eye glasses 7 can determine which shutter; namely the right-eye shutter or the left-eye shutter, should be closed based on the difference in the emitting period even though the emitting unit 138 emits the infrared light only once. As a result, the emission of lights from the emitting units 138 can be appropriately controlled through the scanning line 139 even in the case where the emitting units 138 and the pixel units 136 are placed mixed in the row 133.

Described next are the electronic eye glasses 7 included in the video display system along with the organic EL display device 1b.

Here, the substantial structure of the electronic eye glasses 7 is similar to that shown in FIG. 4. Concurrently, the control unit 73 is modified so that the control unit 73 recognizes differences among pulse widths of the control signal, instead of the pulse number of the control signal, in order to distinguish the first frame from the second frame.

Figure 10:
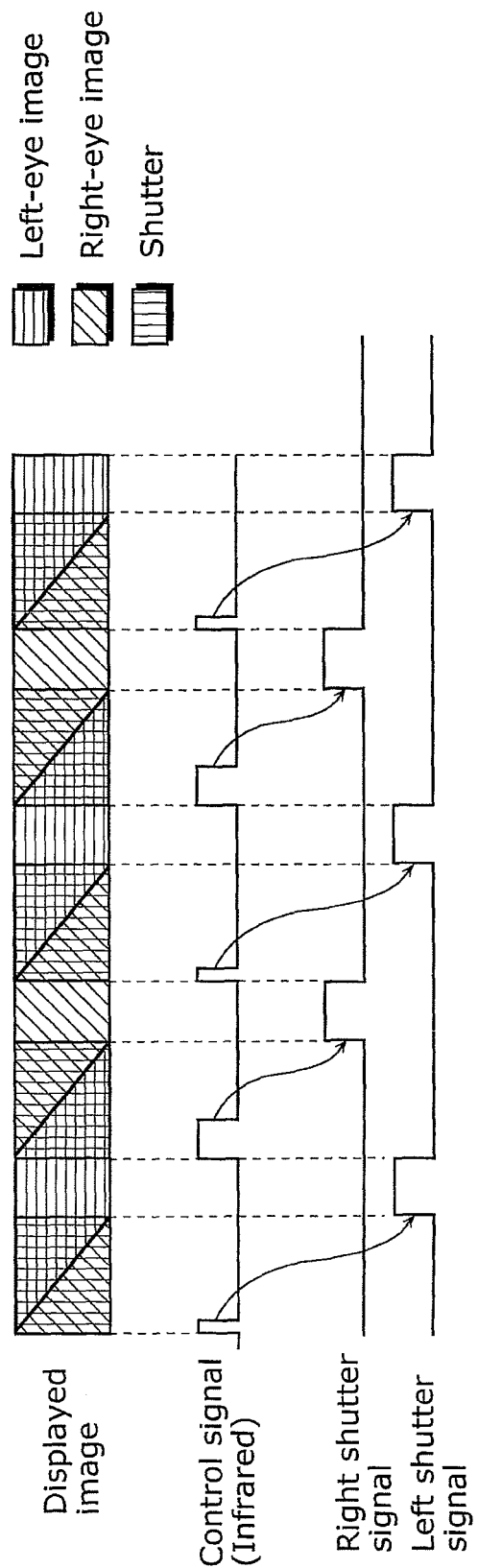
FIG. 10 is a timing diagram exemplifying an operation of electronic eye glasses according to Embodiment 2 in the present invention.

FIG. 10 is a timing diagram exemplifying an operation of the electronic eye glasses 7 to be used with the organic EL display device 1b.

The bar shown on the top of FIG. 10 is that shown in FIG. 9 for the sake of understanding.

The rest of illustration in FIG. 10 shows the details of main signals used in the electronic eye glasses 7.

The control signal (infrared light) is received and converted into the electric signal by the communications unit 72.

For example, the right and left shutter signals are generated by the control unit 7, and supplied to the left liquid crystal shutter 74 and the right liquid crystal shutter 75 in order to control the opening and closing of the shutters. The control unit 73 includes a clock generator, a counter, and a comparator. While the control signal is being received, the counter counts a clock signal provided from the clock generator, and the comparator may compare the result value of the counting with a threshold value. Accordingly, the control unit 73 may provide an appropriate one of the right shutter signal and the left shutter signal.

As an example, taken into consideration is a case of a frame rate of 120 frames per second (one horizontal blanking interval is 7.4 μs). Adopted here are the following: pulse widths of control signals in the first frame and the second frame are respectively 5.5 μs and 5.0 μs, and a frequency of a clock signal to be provided from the clock generator is 10 MHz. Hence, the result values of the counting to be expected for the first frame and the second frame are 55 and 50, respectively. Setting the threshold value between 52 and 53 makes possible stable recognition of the first frame and the second frame.

In the case where the pulse widths of the control signal and the scanning signal are maintained 5.5 μs in the first frame and 5.0 μs in the second frame, all the pixel units 136 can load data signals in 74% or 68% of one frame period. Thus, the shutter opening period can be set at the duty cycle of at least 26% for one frame period.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to a video display device such as an organic EL display device, and is particularly beneficial to a video display system for receiving three-dimensional video via electronic eye glasses.

What is claimed is:

1. An organic electroluminescence display device that emits infrared light to be received by eye glasses equipped with electronic shutters for first and second eyes, the organic electroluminescence display device comprising:
   pixels that each include a luminescent element that emits visible light and a pixel driver that drives the luminescent element;
   a display that includes the pixels, the pixels being arranged in an N×M matrix;
   a data line driver that supplies a video signal to each of the pixels included in the display, the video signal being used to construct a three-dimensional video and including a first frame and a second frame, the first frame corresponding to first-eye image information of the three-dimensional video and the second frame corresponding to second-eye image information of the three-dimensional video; and
   a scanning line driver that distributes a scanning signal to each of the pixels for controlling a supply of the video signal to each of the pixels,
   wherein the display includes at least one emitter in at least one arrangement position of the pixels in the N×M matrix,
   the emitter includes a predetermined element that emits infrared light in a same direction as the visible light of the luminescent element and an element driver that drives the predetermined element, and
   the scanning line driver supplies a control signal to the emitter that indicates a switching timing between the first frame and the second frame, and causes the predetermined element to emit the infrared light based on the control signal for reception by the eye glasses for controlling opening and closing of the electronic shutters of the eye glasses for the first and second eyes.

2. The organic electroluminescence display device according to claim 1,
   wherein the scanning line driver is connected to the pixels arranged in the N×M matrix via scanning lines provided on a line-by-line basis, and supplies the control signal to the emitter via the scanning lines.

3. The organic electroluminescence display device according to claim 1,
   wherein the emitter comprises a plurality of emitters in arrangement positions of the pixels in the N×M matrix.

4. The organic electroluminescence display device according to claim 3,
   wherein the emitters are in a line of a first line through an N-th line of the N×M matrix.

5. The organic electroluminescence display device according to claim 4,
   wherein the emitters are in the first line of the N×M matrix.

6. The organic electroluminescence display device according to claim 1, further comprising:
   a signal processor configured to externally receive the video signal, and generate an identifying signal from the video signal that identifies whether a frame of the video signal is one of the first frame and the second frame; and a signal generator configured to generate the control signal based on the identifying signal.

7. The organic electroluminescence display device according to claim 6,
wherein the signal generator is included in the scanning line driver.

8. The organic electroluminescence display device according to claim 7,
wherein the signal generator is configured to generate the control signal such that a number of times that the predetermined element emits the infrared light differs between the first frame and the second frame.

9. The organic electroluminescence display device according to claim 8,
wherein the signal generator is configured to generate the control signal such that the control signal causes the predetermined element to emit the infrared light twice when the frame of the video signal is the first frame and once when the frame of the video signal is the second frame.

10. The organic electroluminescence display device according to claim 7, further comprising:
a controller configured to supply the video signal to the data line driver and the scanning signal to the scanning line driver,
wherein the signal generator is configured to generate the control signal by receiving the identifying signal from the signal processor and the scanning signal supplied from the controller to the scanning line driver, and by adding the identifying signal to the scanning signal, the scanning signal being supplied to at least two lines of a first line through an N-th line of the N×M matrix other than a line in which the emitter is disposed.

11. The organic electroluminescence display device according to claim 6,
wherein the N×M matrix includes a first line through an N-th line, and the emitter and ones of the pixels are mixed in a predetermined line of the first line through the N-th line,
the signal generator is configured to supply the scanning line driver with the control signal for the predetermined line, and
the scanning line driver supplies the control signal for the predetermined line to the emitters and the ones of the pixels arranged in the predetermined line, the control signal being supplied via a scanning signal connected to the predetermined line.

12. The organic electroluminescence display device according to claim 11,
wherein the signal generator generates the control signal such that the predetermined element emits the infrared light once in the frame, and an emitting period of the predetermined element when the frame is the first frame is different than when the frame is the second frame.

13. The organic electroluminescence display device according to claim 12,
wherein the emitter comprises a plurality of emitters, and
the scanning line driver controls the emitting period of the predetermined element to be different between the first frame and the second frame and between the predetermined element included in each of the plurality of emitters.

14. The organic electroluminescence display device according to claim 12,
wherein the scanning line driver provides the control signal, as the scanning signal, to the ones of the pixels in the predetermined line for controlling the supply of the video signal to the ones of the pixels.

15. The organic electroluminescence display device according to claim 12,
wherein the signal generator is configured to generate the control signal such that the emitting period of the predetermined element is longer when the frame is the first frame than when the frame is the second frame.

16. The organic electroluminescence display device according to claim 15,
wherein the scanning line driver provides the control signal to the emitter in the predetermined line, and controls the emitting period of the predetermined element such that the emitting period is longer for the first frame than for the second frame.

17. The organic electroluminescence display device according to claim 15,
wherein the scanning line driver provides the control signal, as the scanning signal, to the ones of the pixels in the predetermined line such that a supplying period of the video signal to the ones of the pixels is longer for the first frame than for the second frame.

18. The organic electroluminescence display device according to claim 1,
wherein a first surface area of the emitter driver included in the emitter is greater than a second surface area of the pixel driver included in each of the pixels.

19. The organic electroluminescence display device according to claim 18,
wherein a scanning line representing a line in which the emitter is arranged is connected to a gate electrode of the emitter driver included in the emitter, and
the scanning line driver causes the predetermined element to emit the infrared light by supplying the control signal to the gate electrode of the emitter driver included in the emitter.

20. An image displaying system, comprising:
an organic electroluminescence display device; and
eye glasses that include electronic shutters,
wherein the organic electroluminescence display device includes:
pixels that each include a luminescent element that emits visible light and a pixel driver that drives the luminescent element;
a display that includes the pixels, the pixels being arranged in an N×M matrix;
a data line driver that supplies a video signal to each of the pixels included in the display, the video signal being used to construct a three-dimensional video and including a first frame and a second frame, the first frame corresponding to first-eye image information of the three-dimensional video and the second frame corresponding to second-eye image information of the three-dimensional video; and
a scanning line driver that distributes a scanning signal to each of the pixels for controlling a supply of the video signal to each of the pixels,
the display includes at least one emitter that includes a predetermined element that emits infrared light and an element driver that drives the predetermined element,
the scanning line driver supplies a control signal to the emitter that indicates a switching timing between the first frame and the second frame, and causes the predetermined element to emit the infrared light based on the control signal,
the eye glasses that include the electronic shutters comprise:

a first shutter for a first eye;

a second shutter for a second eye;

a receiver configured to receive the infrared light emitted from the predetermined element; and a controller configured to control opening and closing of the first shutter for the first eye and the second shutter for the second eye in response to the receiver receiving the infrared light, the display includes, instead of at least one of the pixels, the emitter in an arrangement position of the pixels in the N×M matrix, and the predetermined element emits the infrared light in a same direction as the visible light of the luminescent elements.

21. An image displaying method for an image displaying system, the image display system including an organic electroluminescence displaying device and eye glasses that include electronic shutters, wherein the organic electroluminescence displaying device comprises:

pixels that each include a luminescent element that emits visible light and a pixel driver that drives the luminescent element;

a display that includes the pixels, the pixels being arranged in an N×M matrix;

a data line driver that supplies a video signal to each of the pixels included in the display, the video signal being used to construct a three-dimensional video and including a first frame and a second frame, the first frame corresponding to first-eye image information of the three-dimensional video and the second frame corresponding to second-eye image information of the three-dimensional video; and a scanning line driver that distributes a scanning signal to each of the pixels for controlling a supply of the video signal to each of the pixels, the display includes, instead of at least one of the pixels, at least one emitter in at least one arrangement position of the pixels in the N×M matrix, the emitter includes a predetermined element that emits infrared light in a same direction as the visible light of the luminescent element and an element driver that drives the predetermined element, the eye glasses that include the electronic shutters comprise:

a first shutter for a first eye;

a second shutter for a second eye;

a receiver configured to receive the infrared light emitted from the predetermined element; and a controller configured to control opening and closing of the first shutter for the first eye and the second shutter for the second eye, the image displaying method comprises:

supplying a control signal to the emitter that indicates a switching timing between the first frame and the second frame and causes the predetermined element, included in the emitter, to emit the infrared light based on the control signal;

receiving the infrared light emitted from the predetermined element; and switching opening and closing of the first shutter for the first eye and the second shutter for the second eye in response to the receiver receiving the infrared light.

* * * * *